US010048085B2

(12) United States Patent
Moore et al.

(10) Patent No.: US 10,048,085 B2
(45) Date of Patent: *Aug. 14, 2018

(54) NAVIGATION PEEK AHEAD AND BEHIND

(71) Applicant: Apple Inc., Cupertino, CA (US)

(72) Inventors: Christopher D. Moore, San Francisco, CA (US); Christopher Blumenberg, Cupertino, CA (US); Marcel van Os, Santa Cruz, CA (US); Billy P. Chen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/462,593

(22) Filed: Mar. 17, 2017

(65) Prior Publication Data
US 2017/0254661 A1 Sep. 7, 2017

Related U.S. Application Data

(63) Continuation of application No. 14/292,609, filed on May 30, 2014, now Pat. No. 9,599,485.

(51) Int. Cl.
*G01C 21/26* (2006.01)
*G01C 21/36* (2006.01)
G01C 21/34 (2006.01)

(52) U.S. Cl.
CPC ..... *G01C 21/3632* (2013.01); *G01C 21/3635* (2013.01); *G01C 21/3638* (2013.01); *G01C 21/3664* (2013.01); G01C 21/3415 (2013.01)

(58) Field of Classification Search
CPC .............. G01C 21/3635; G01C 21/367; G01C 21/3632; G01C 21/3415; G08G 1/096866
(Continued)

(56) References Cited
U.S. PATENT DOCUMENTS 7,054,744 B2    5/2006  Hirose
9,599,485 B2 *  3/2017  Moore ............... G01C 21/3632
(Continued)

*Primary Examiner* — Isaac G Smith
(74) *Attorney, Agent, or Firm* — Invoke

(57) ABSTRACT

Some embodiments of the invention provide a navigation application that allows a user to peek ahead or behind during a turn-by-turn navigation presentation that the application provides while tracking a device (e.g., a mobile device, a vehicle, etc.) traversal of a physical route. As the device traverses along the physical route, the navigation application generates a navigation presentation that shows a representation of the device on a map traversing along a virtual route that represents the physical route on the map. While providing the navigation presentation, the navigation application can receive user input to look ahead or behind along the virtual route. Based on the user input, the navigation application moves the navigation presentation to show locations on the virtual route that are ahead or behind the displayed current location of the device on the virtual route. This movement can cause the device representation to no longer be visible in the navigation presentation. Also, the virtual route often includes several turns, and the peek ahead or behind movement of the navigation presentation passes the presentation through one or more of these turns. In some embodiments, the map can be defined presented as a two-dimensional (2D) or a three-dimensional (3D) scene.

19 Claims, 11 Drawing Sheets

(58) Field of Classification Search
USPC ..... 701/454, 460, 519; 345/419; 340/995.19
See application file for complete search history.

(56) References Cited

U.S. PATENT DOCUMENTS

| | | |
|---|---|---|
| 2004/0021643 A1 | 2/2004 | Hoshino |
| 2009/0082960 A1 | 3/2009 | Ramaswamy |
| 2010/0115455 A1 | 5/2010 | Kim |
| 2010/0185386 A1* | 7/2010 | Hess .................. G01C 21/3655 |
| | | 701/533 |
| 2001/0112750 | 5/2011 | Lukassen |
| 2011/0144904 A1 | 6/2011 | Pinkus |
| 2012/0032974 A1 | 2/2012 | Lynch |
| 2012/0109513 A1 | 5/2012 | Belimpasakis |
| 2012/0303263 A1 | 11/2012 | Alam et al. |
| 2014/0365122 A1 | 12/2014 | McGavran et al. |
| 2015/0345976 A1 | 12/2015 | Moore et al. |

* cited by examiner

NAVIGATION PEEK AHEAD AND BEHIND

CROSS-REFERENCE TO RELATED APPLICATIONS

This application is a continuation of U.S. patent application Ser. No. 14/292,609, filed May 30, 2014, now U.S. Pat. No. 9,599,485 issued Mar. 21, 2017, the content of which is incorporated herein by reference in its entirety.

BACKGROUND

Many map-based applications available today are designed for a variety of different devices (e.g., desktops, laptops, tablet devices, smartphones, handheld global positioning system (GPS) receivers, etc.) and for various different purposes (e.g., navigation, browsing, sports, etc.). Most of these applications generate displays of a map based on map data that describes relative locations of streets, highways, points of interest, etc., in the map. Some map-based applications provide a navigation feature, which provides the user with turn-by-turn instructions to a destination. Most of these applications, however, do not have sophisticated features that today's demanding users wish to have in their map-based applications.

BRIEF SUMMARY

Some embodiments of the invention provide a navigation application that allows a user to peek ahead or behind during a turn-by-turn navigation presentation that the application provides while tracking a device (e.g., a mobile device, a vehicle, etc.) traversal of a physical route. As the device traverses along the physical route, the navigation application generates a navigation presentation that shows a representation of the device on a map traversing along a virtual route that represents the physical route on the map. While providing the navigation presentation, the navigation application can receive user input to look ahead or behind along the virtual route. Based on the user input, the navigation application changes the navigation presentation to show locations on the virtual route that are ahead or behind the displayed current location of the device on the virtual route. This change can cause the device representation to no longer be visible in the navigation presentation. Also, the virtual route often includes several turns, and the peek ahead or behind movement of the navigation presentation can pass the presentation through one or more of these turns. In some embodiments, the map can be presented as a two-dimensional (2D) or a three-dimensional (3D) scene.

In some embodiments, the device has a touch-sensitive display screen through which it can receive touch input for moving the navigation presentation along the virtual route. In some of these embodiments, the navigation application computes a first distance based on the received touch input. Based on the computed first distance, the navigation application computes a second distance to move the navigation presentation along the route. In some embodiments, the second computed distance is directly proportional to the first computed distance. In other embodiments, the second distance is not directly proportional to the first computed distance. For instance, some embodiments compute the second distance based on a formulation that reduces gradually increases to the second distance as the first distance increases.

After moving the navigation presentation ahead or behind the current position, the navigation application in some embodiments returns the navigation presentation to the displayed current location in the map that corresponds to the current location of the device along the physical route. For instance, in some embodiments, the navigation application returns the navigation presentation to the current location when the device reaches a location along the physical route at which the device has to perform a navigation maneuver. Conjunctively, or alternatively, the navigation application in some embodiments returns the navigation presentation to the current location based on the expiration of a timer that the application set after the touch input terminated. Alternatively, the navigation application in some embodiments returns the navigation presentation to the current location once the touch input terminates.

In some embodiments, the application generates the navigation presentation from a perspective of a virtual camera that traverses along a virtual route on a map as the device traverses along the physical route. As the virtual camera traverses along the virtual route, it defines for rendering successive scenes of the map that correspond to successive positions of the device along the physical route. Based on the user input, the navigation application moves the virtual camera along the virtual route to generate renderings of the map at locations ahead or behind on the virtual route. In some cases, the virtual route includes several turns, and the movement of the virtual camera takes the virtual camera past one or more of these turns.

As mentioned above, the map in some embodiments can be presented as a two-dimensional (2D) or a three-dimensional (3D) scene. When the map is viewed as a 2D scene, the virtual camera captures successive top-down views of the 2D map scene in some embodiments. On the other hand, when the map is viewed as a 3D scene, the virtual camera captures successive perspective views of the 3D map scene in some embodiments. In some embodiments, the navigation application changes an angle of rotation of the virtual camera so that the perspective view generated by the virtual camera includes more of the 3D map scene that is ahead along the route. Some embodiments change the virtual camera's angle of rotation before moving of the virtual camera, while other embodiments change the virtual camera's angle of rotation while moving of the virtual camera.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
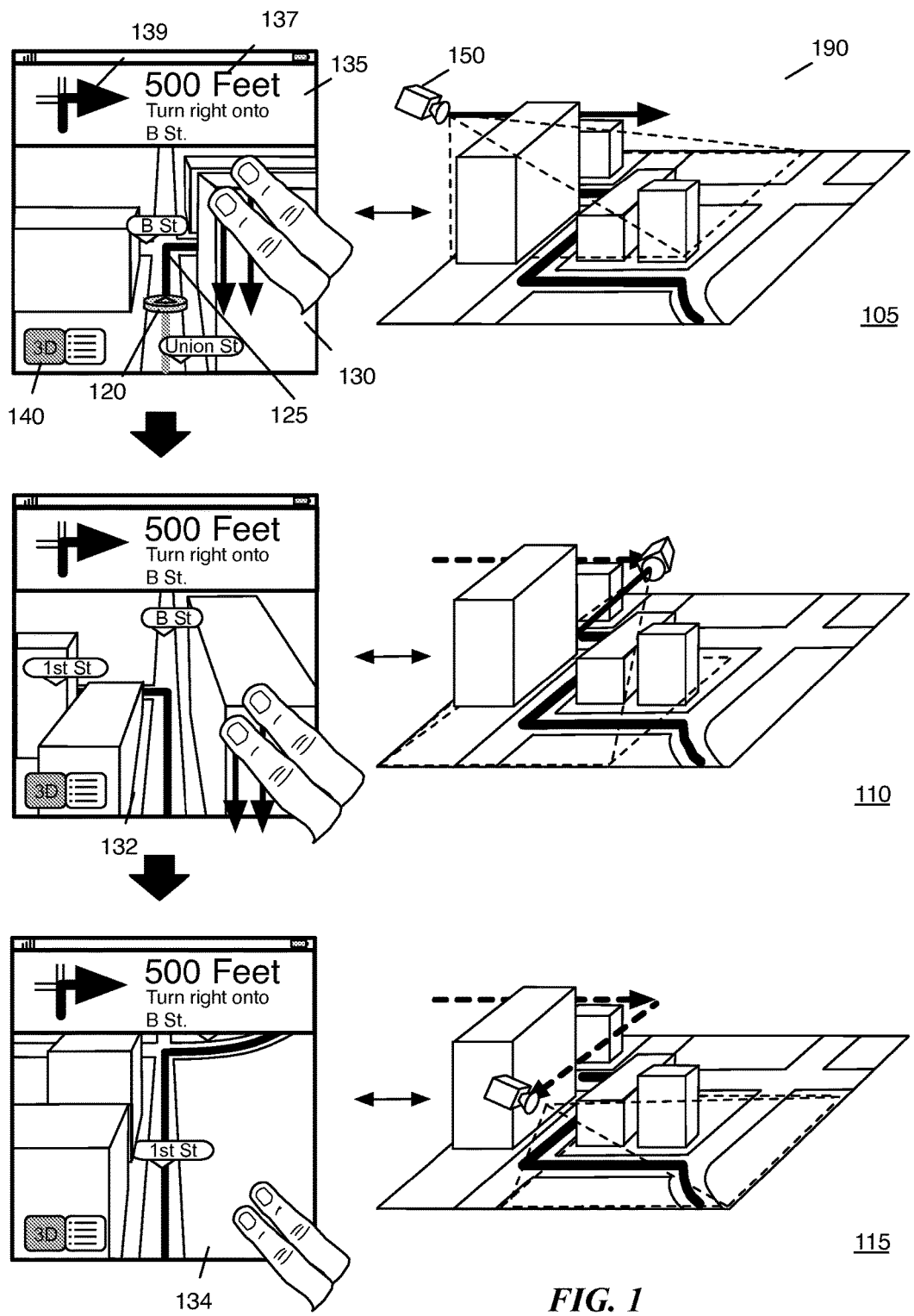
FIG. 1 illustrates an example of a navigation application that allows a user to peek ahead along a navigated route.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a navigation application that allows a user to peek ahead or behind during a turn-by-turn navigation presentation that the application provides while tracking a device (e.g., a mobile device, a vehicle, etc.) traversal of a physical route. To provide navigation instructions between a starting location and a destination location, the navigation application identifies a physical route between the two locations and generates a navigation presentation that shows a representation of the device on a map traversing along a displayed virtual route that represents the physical route.

As the device reaches junctures along the physical route at which the device has to perform a maneuver, the navigation presentation provides visual and/or audible instructions regarding the maneuver that the device has to perform. To provide such instructions and presentation, the navigation application uses one or more location services (e.g., global positioning system (GPS) service) of the device to track the current position of the device and correlate the tracked position to a position on the navigated route. During turn-by-turn navigation, the navigation application in some embodiments (1) detects when the device has traveled off route, (2) identifies another route to the destination, and (3) displays new route and instructions to the destination based on the newly identified route.

While providing the navigation presentation, the navigation application can receive user input to look ahead or behind along the virtual route. Based on the user input, the navigation application changes the navigation presentation to show locations on the virtual route that are ahead or behind the displayed current location of the device on the virtual route. This change can cause the device representation to no longer be visible in the navigation presentation. Also, the virtual route often includes several turns, and the peek ahead or behind movement of the navigation presentation can pass the presentation through one or more of these turns. In some embodiments, the map can be presented as a two-dimensional (2D) or a three-dimensional (3D) scene.

In some embodiments, the device has a touch-sensitive display screen. For instance, in some embodiments, the device has a multi-touch interface for allowing a user to provide touch and gestural inputs through the screen to interact with the application. Examples of such devices are smartphones (e.g., iPhones® sold by Apple Inc., phones operating the Android® operating system, phones operating the Windows® operating system, etc.), tablet computers (e.g., iPads® sold by Apple Inc., tablets operating the Android® operating system, tablets operating the Windows® operating system, etc.), laptop computers, desktop computers, etc.

Through the touch interface, the navigation application can receive touch input for moving the navigation presentation along the virtual route. In some of these embodiments, the navigation application computes a first distance based on the received touch input. Based on the computed first distance, the navigation application computes a second distance to move the navigation presentation along the route. In some embodiments, the second computed distance is directly proportional to the first computed distance. In other embodiments, the second distance is not directly proportional to the first computed distance. For instance, some embodiments compute the second distance based on a formulation that reduces gradually increases to the second distance as the first distance increases.

After moving the navigation presentation ahead or behind the current position, the navigation application in some embodiments returns the navigation presentation to the displayed current location in the map that corresponds to the current location of the device along the physical route. For instance, in some embodiments, the navigation application returns the navigation presentation to the current location when the device reaches a location along the physical route at which the device has to perform a navigation maneuver. Conjunctively, or alternatively, the navigation application in some embodiments returns the navigation presentation to the current location based on the expiration of a timer that the application set after the touch input terminated. Alternatively, the navigation application in some embodiments returns the navigation presentation to the current location once the touch input terminates.

In some embodiments, the application generates the navigation presentation from a perspective of a virtual camera that traverses along a virtual route on a map as the device traverses along the physical route. In some embodiments, the virtual camera traverses along the virtual route based on the travel direction and speed of the device traveling along the physical route. In some embodiments, the direction and speed of the device are captured by and derived from directional data (e.g., GPS data, triangulated cell-tower data, etc.) associated with the device.

As the virtual camera traverses along the virtual route, it defines for rendering successive scenes of the map that correspond to successive positions of the device along the physical route. Based on the user input, the navigation application moves the virtual camera along the virtual route to generate renderings of the map at locations ahead or behind on the virtual route. In some cases, the virtual route includes several turns, and the movement of the virtual camera takes the virtual camera past one or more of these turns.

As mentioned above, the map in some embodiments can be presented as a two-dimensional (2D) or a three-dimensional (3D) scene. When the map is viewed as a 2D scene, the virtual camera captures successive top-down views of the 2D map scene in some embodiments. On the other hand, when the map is viewed as a 3D scene, the virtual camera captures successive perspective views of the 3D map scene in some embodiments. In some embodiments, the navigation application allows a user to change the perspective rendering position of the virtual camera so that the virtual camera can capture the 3D navigation scene from a variety of different perspectives (e.g., from a variety of different positions and orientations).

In some embodiments, the navigation application changes an angle of rotation of the virtual camera so that the perspective view generated by the virtual camera includes more of the 3D map scene that is ahead along the route. Some embodiments change the virtual camera's angle of rotation before moving of the virtual camera, while other embodiments change the virtual camera's angle of rotation while moving of the virtual camera.

Several more detailed embodiments of the invention will now be described by reference to FIGS. 1-6. In these embodiments, the navigation presentation is a driving navigation presentation that shows the device traversing along a road network. However, in some embodiments, the peek ahead feature and/or peek behind feature are provided in walking navigation presentations or other navigation presentations that show the device traversing along walking or other pathways. Thus, one of ordinary skill should understand that the embodiments described below are equally applicable to all types of navigation presentations, such as driving navigation presentations, walking navigation presentations, biking navigation presentations, etc. Examples of other walking navigation presentations are described in U.S. patent application Ser. No. 14/055,847.

FIG. 1 illustrates an example of a navigation application that allows a user to peek ahead along a navigated route. In this example, the navigation application executes on a device (e.g., a mobile device, a vehicle's electronic information system, etc.) that has a touch-sensitive display screen for receiving touch inputs (e.g., single touch or multi-touch inputs) and/or gestural inputs through the screen to interact with the application. In some embodiments, the navigation application is a standalone application, while in other embodiments it is part of another application, e.g., is part of an integrated mapping application that includes several modalities, such as location browsing, map searching, route inspection and route navigating operations.

To provide its navigation operations, the navigation application uses one or more location services of the device and one or more local or remote route generating services. Specifically, the navigation application of different embodiments obtains a route between two locations differently. In some embodiments, the navigation application computes the route locally on the device, while in other embodiments, the navigation application sends the information about the starting and ending locations to a remote server, which computes the route and returns the computed route back to the navigation application. The navigation application uses one or more location services of the device to track the current position of the device and correlate the tracked position to a position on the navigated route. For instance, in some embodiments, the navigation application uses GPS coordinates received through the device's GPS receiver.

The example presented FIG. 1 is illustrated in terms of three operational stages 105, 110, and 115 of the user interface (UI) of the navigation application. Each stage has two sides, a left side showing a navigation presentation output of the navigation application and a right side showing the manner by which the navigation application generates that stage's navigation presentation output. As shown by the right side of each of the stages, the navigation application uses a virtual camera 150 that captures a 3D map scene 190 to produce the navigation presentation.

Specifically, to present turn-by-turn navigation instructions, the navigation application of FIG. 1 tracks the device's traversal of a physical route and provides a navigation presentation from a perspective of the virtual camera 150 that traverses along a virtual route 125 on a map 190 as the device traverses along the physical route between two locations in the physical world. As the virtual camera traverses along the virtual route, it specifies for rendering successive scenes of the map that correspond to successive positions of the device along the physical route, as further described below.

While providing the navigation presentation, the navigation application can receive user input to look ahead or behind along the virtual route. Based on the user input, the navigation application moves the virtual camera along the virtual route to generate renderings of the map at locations ahead or behind on the virtual route. In some cases, the virtual route includes several turns, and the movement of the virtual camera takes the virtual camera past one or more of these turns.

The left-side of the three stages 105, 110 and 115 shows the navigation application changing the navigation presentation in response to a two-finger swipe gesture. The first stage 105 shows the navigation presentation at the start of the two-finger swipe gesture. At this stage, the navigation application displays a navigation presentation that includes (1) the current position of the device with the puck 120, (2) the virtual route 125 that lays ahead of the puck to represent the physical route that the device still has to navigate to the destination, (3) a 3D map view 130 (e.g., buildings, streets, etc.) that is about the virtual route, and (4) a banner 135 that overlays the 3D map view to provide text instruction 137 and graphical instruction 139 regarding an upcoming navigation maneuver. Although the swipe-down gesture is shown in FIG. 1 to direct the application to perform the peek ahead operation, other input (e.g., the swipe-up gesture) in other embodiments initiates the peek ahead operation.

The navigation application uses a 3D affordance 140 to transition the navigation presentation between a 3D presentation and a 2D presentation. This affordance changes its appearance (e.g., changes its shading) to signify whether the navigation presentation is in 2D or 3D. When the map is viewed as a 2D scene, the virtual camera 150 captures successive top-down views of the map scene 130. On the other hand, when the map is viewed as a 3D scene, the virtual camera captures successive perspective views of the 3D map scene in some embodiments. The right side of the first stage 105 shows the perspective view that the virtual camera captures to produce the navigation presentation that is provided on the left side of this stage. As mentioned above, this perspective view and its associated navigation presentation are defined to be about the current location of the device.

The second stage 110 shows the navigation presentation after it has moved in response to the swipe gesture of the first stage 105. The second stage 110 shows the presentation after it has moved along the virtual route 125 past the puck 120, which represents the current location of the device. Specifically, the left side of the second stage 110 shows the navigation presentation after it moves past the current position of the device on Union street, turns right on B street and approaches a left turn on $1^{st}$ street. The right side of the second stage 110 shows the virtual camera 150 after it has moved along the virtual route from Union Street and onto B street on the 3D map scene 190. The virtual camera's perspective view of the 3D map scene 190 in the second stage is used to produce the 3D map view 132 of the navigation presentation that is shown on the left side of this stage.

The second stage 110 shows the continuation of the swipe gesture. Accordingly, the third stage 115 shows the navigation presentation after it has turned left turn on $1^{st}$ street and is approaching a round about ahead. The right side of the second stage 110 shows the virtual camera 150 after it has moved along the virtual route from B street onto $1^{st}$ street on the 3D map scene 190. The virtual camera's perspective view of the 3D map scene 190 in the third stage is used to produce the 3D map view 134 of the navigation presentation that is shown on the left side of this stage.

In some embodiments, the navigation application computes the distance to move the virtual camera in response to a swipe gesture based on the length of the swipe gesture on the display screen of the device. For instance, in some embodiments, the navigation application computes a first distance based on the received swipe input. Based on the computed first distance, the navigation application computes a second distance to move the virtual camera along the route. In some embodiments, the second computed distance is directly proportional to the first computed distance. In other embodiments, the second distance is not directly proportional to the first computed distance. For instance, some embodiments compute the second distance based on a formulation that reduces gradually increases to the second distance as the first distance increases.

In some embodiments, the navigation application presents a new maneuver banner 135 for the next upcoming maneuver as the device travels along a navigated route, in order to present text and graphical information about the upcoming maneuver in the new maneuver banner. As shown in the example illustrated in FIG. 1, the navigation application in some embodiments does not change the maneuver banner 135 as it changes the navigation presentation to allow a user to peek ahead along the route.

Figure 2:
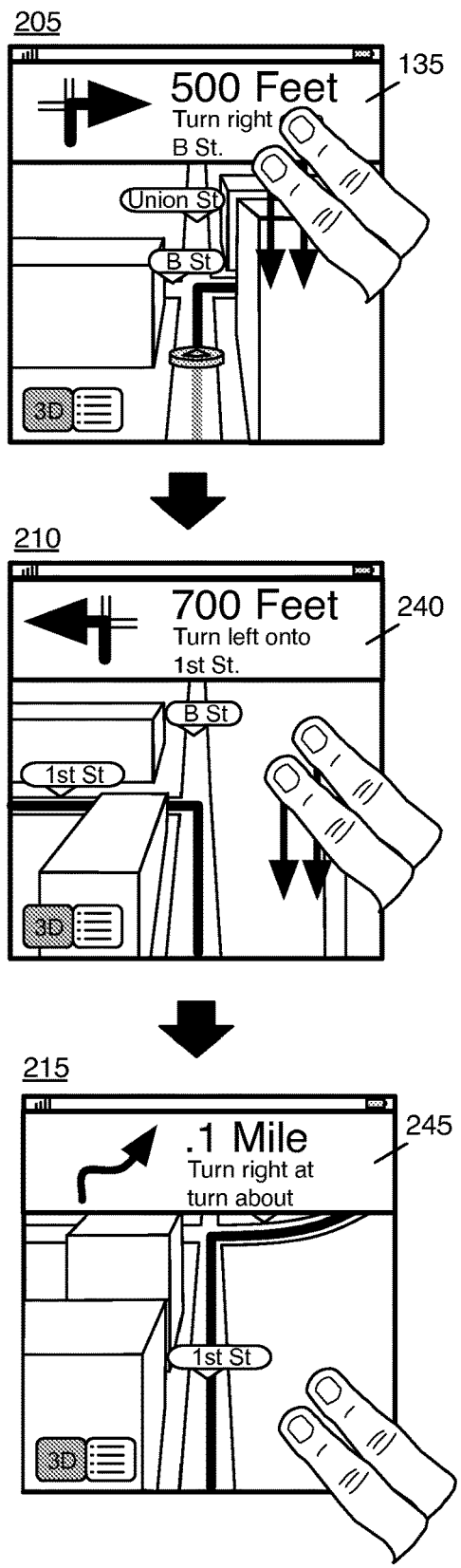
FIG. 2 illustrates the same example as described in FIG. 1, except in the example illustrated in FIG. 2, the navigation application changes the maneuver banners in each stage to show the next upcoming maneuver for virtual route position that is being displayed by the navigation presentation.

In other embodiments, however, the navigation application does change the maneuver banner 135 as it moves the navigation presentation in response to user input to peek ahead along the route. FIG. 2 illustrates the same example as described in FIG. 1, except in the example illustrated in FIG. 2, the navigation application changes the maneuver banners in each stage to show the next upcoming maneuver for virtual route position that is being displayed by the navigation presentation. Accordingly, the banner 135 in first stage 205 shows information about the upcoming right turn on B street, the banner 240 in second stage 210 shows information about the upcoming left turn on $1^{st}$ street, and the banner 245 in the third stage 215 shows information about the maneuver at an upcoming turnabout.

In some embodiments, the navigation application returns the virtual camera to a current location in the map that is defined by a current location of the device along the physical route, after moving the virtual camera in response to user input to peek ahead or behind along a virtual route that is being traversed in the navigation presentation provided by the navigation application.

Figure 3:
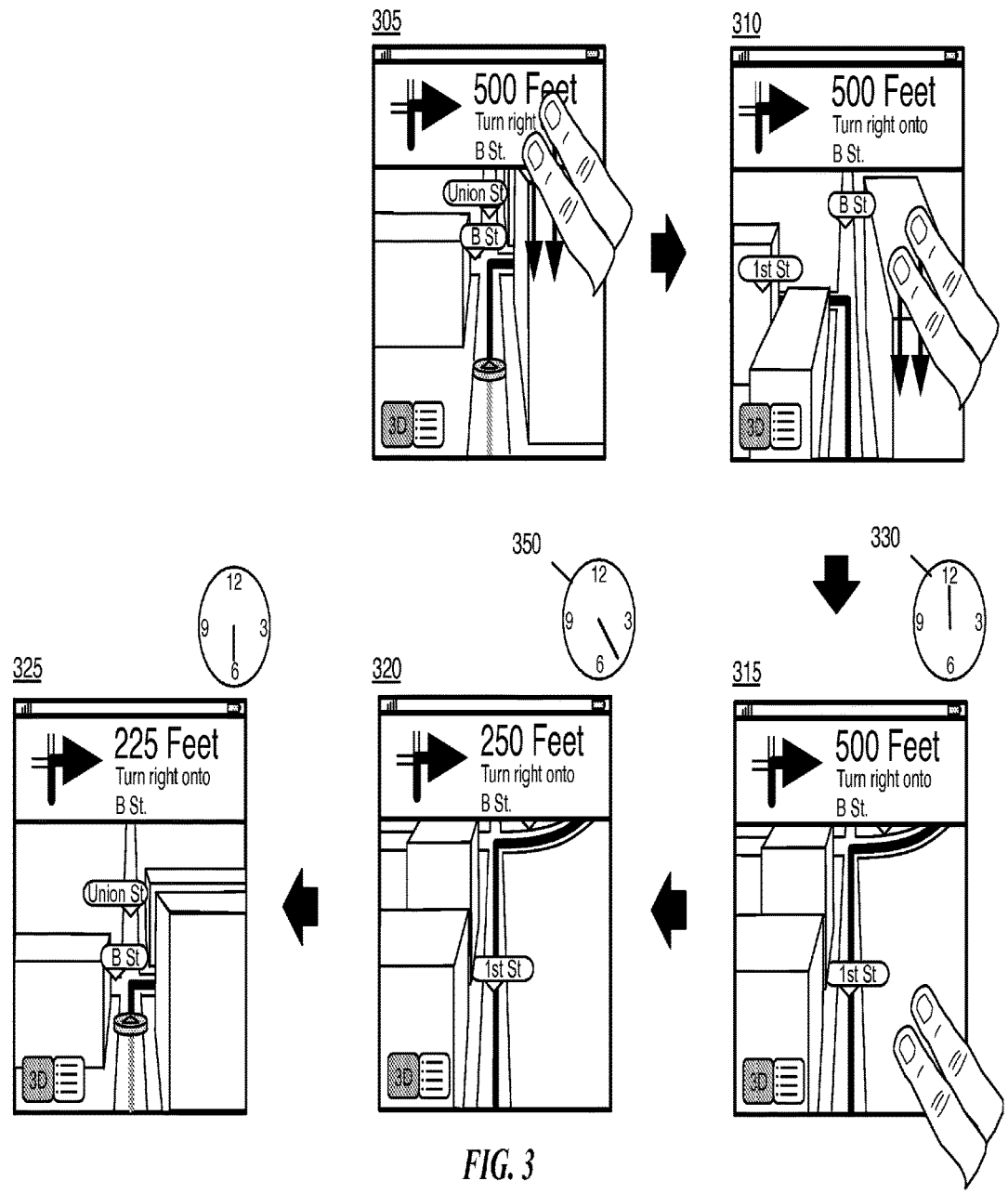
FIG. 3 illustrates an example where the navigation application returns the virtual camera to the device's current location after the expiration of a timer that the application sets once a peek-ahead swipe gesture terminates.

For instance, the navigation application in some embodiments returns the virtual camera to the current location based on expiration of a timer that the application set after the touch input that moved the virtual camera terminated. One such example is illustrated in FIG. 3. In this example, the virtual camera returns to the current location of the device 30 second after the touch input terminated. This example is illustrated in terms of five operational stages 305-325 of the navigation application UI. The first three stages 305, 310, and 315 of this figure are identical to the three stages 105, 110, and 115 of FIG. 1, except now the navigation application sets a timer 330 upon the termination of the swipe gesture at the end of the third stage 315.

The fourth stage 320 shows the navigation application still presenting the navigation presentation at the peek ahead position that was reached at the time of the third stage 315. This is the case even though 25 seconds have elapsed on the timer, and the device has traveled 250 feet towards the juncture with B street, at which point it needs to make a right turn onto this street. The traveled distance can be deduced from the change in the distance information that the banner 135 specifies between the third and fourth stages 315 and 320, while the 25 seconds can be deduced from the rotation of the seconds hand 350 of the timer 330. The fifth stage 325 shows that after 30 seconds, the navigation application returns the navigation presentation to show the current location of the device. In this example, the current location of the device after the 30 seconds is 225 feet from the intersection of Union and B street.

Instead of setting a timer and waiting for it to count up to a particular time value, some embodiments set the timer to a particular value, and then have the timer count down to another value (e.g., to 0). Also, instead of setting a timer and waiting for the timer to expire, the navigation application in some embodiments immediately returns the navigation presentation to the current location of the device when the swipe gesture ends (i.e., when the user terminates the two-finger touch of the display screen). Alternatively, in some embodiments, the navigation application returns the navigation presentation to the current location because the current location corresponds to a location near which the device has to perform a navigation maneuver along the physical route.

Figure 4:
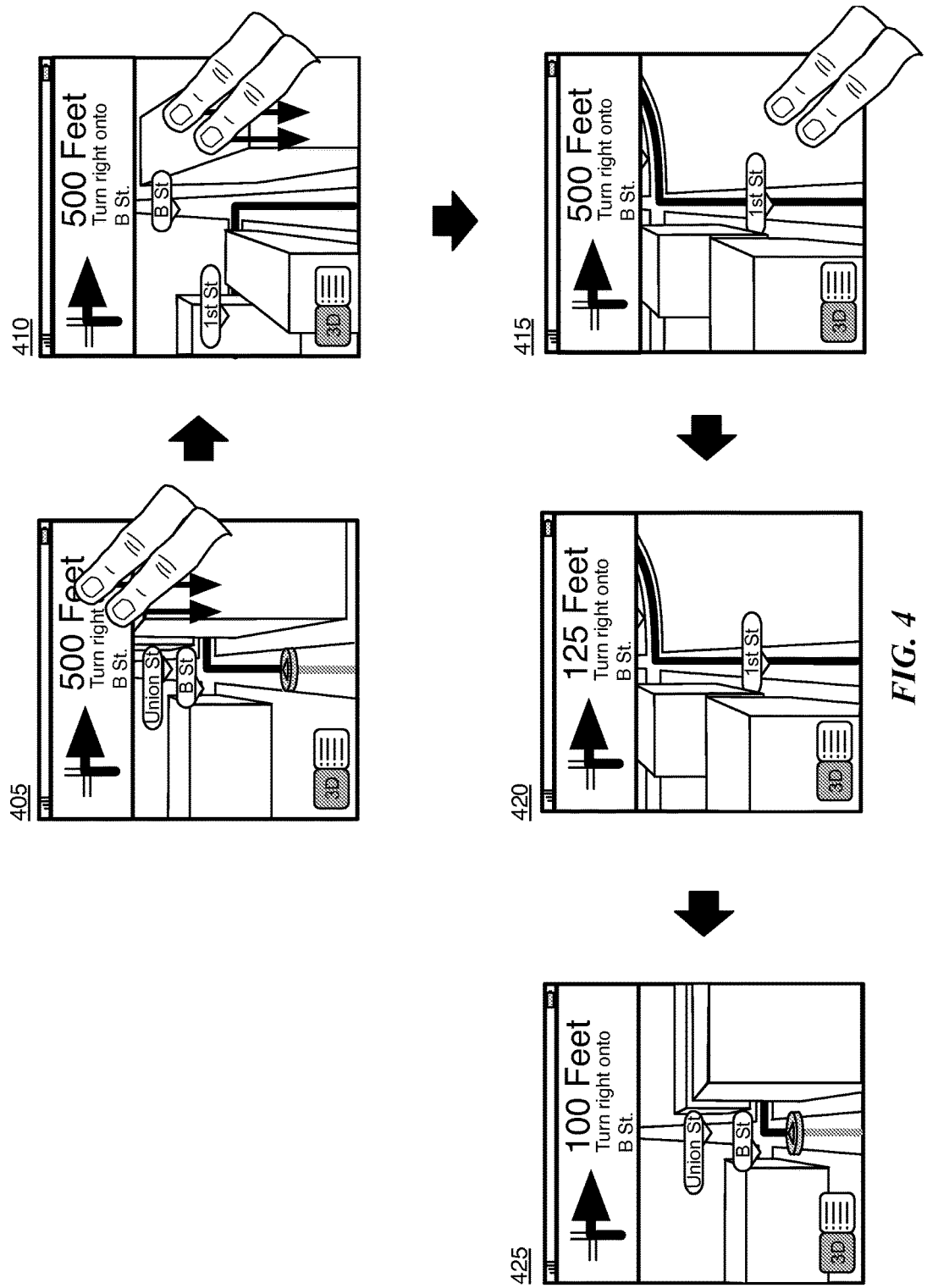
FIG. 4 presents an example that illustrates the navigation application returning the navigation presentation to the current location when the device nears a location for a navigation maneuver.

FIG. 4 presents an example that illustrates the navigation application returning the navigation presentation to the current location when the device nears a location for a navigation maneuver. This example is illustrated in terms of five operational stages 405-425 of the navigation application UI. The first three stages 405-415 of this example are similar to the first three stages 305-315 of the example of FIG. 3. However, in the third stage 415, the navigation application does not set a timer once the swipe gesture ends.

In the fourth stage 420, the navigation presentation remains at the peek ahead position that was reached at the time of the third stage. In this stage, the device is within 125 feet of the intersection of Union and B street, where it has to perform a maneuver. The fifth stage 425 shows that once the device is within 100 feet of this maneuver, the navigation application returns the navigation presentation to the current location of the device because the device will soon have to perform a maneuver along the navigated route to stay on the route.

In some embodiments, the navigation application changes an angle of rotation of the virtual camera so that the perspective view generated by the virtual camera includes more of the 3D map scene that is ahead along the route. Some embodiments change the virtual camera's angle of rotation before moving of the virtual camera, while other embodiments change the virtual camera's angle of rotation while moving of the virtual camera.

Figure 5:
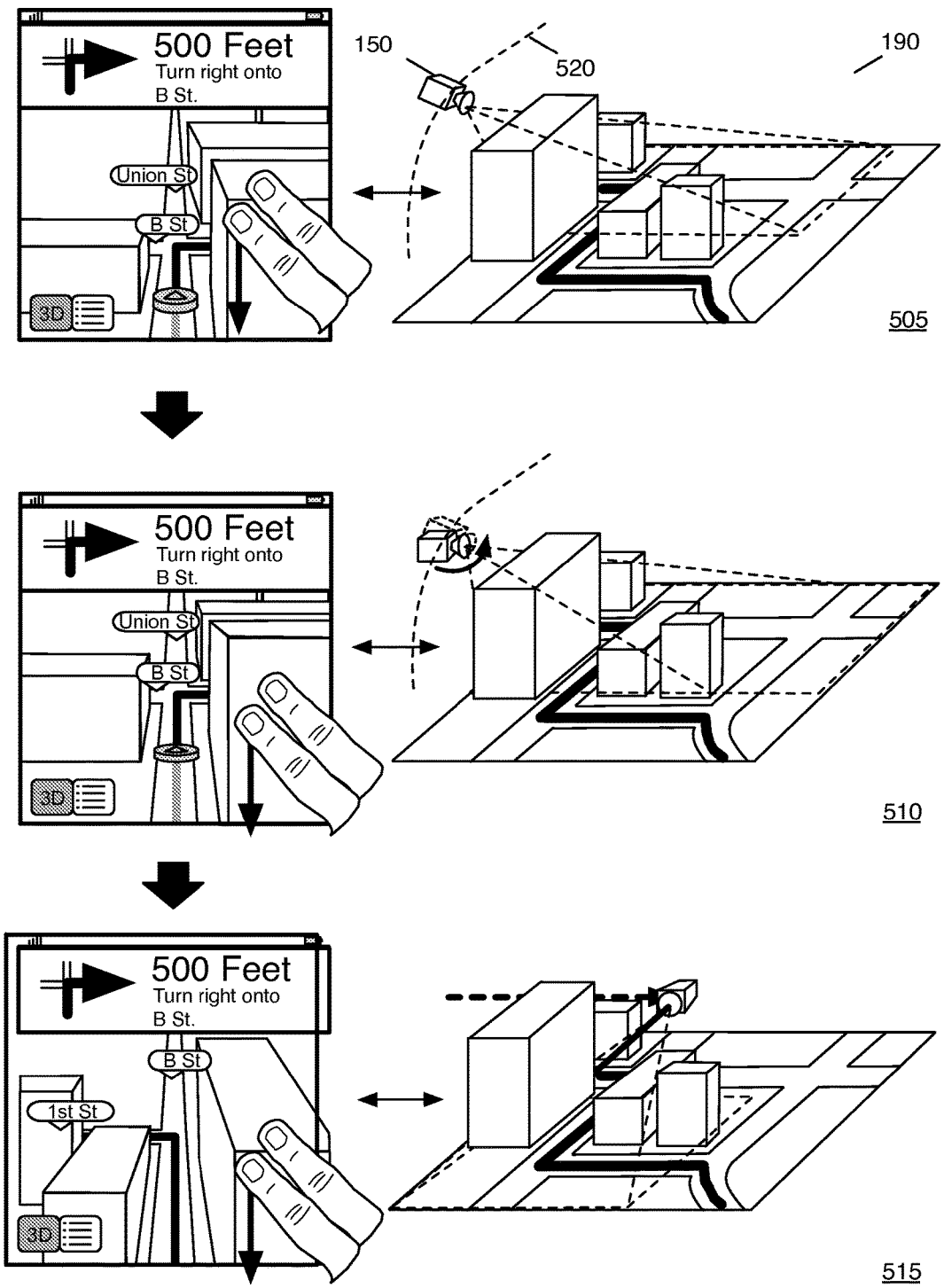
FIG. 5 presents an example that illustrates the navigation application rotating the virtual camera upwards before moving the virtual camera in response to a swipe gesture to peek ahead.

FIG. 5 presents an example that illustrates the navigation application rotating the virtual camera upwards before moving the virtual camera in response to a swipe gesture to peek ahead. This example is illustrated in terms of three operational stages 505-515 of the navigation application UI. The first stage 505 is identical to the first stage 105 of FIG. 1, in that it shows the start of a two-finger swipe gesture to peek ahead while the navigation application is providing a navigation presentation.

The second stage 510 illustrates that upon detecting the peek-ahead swipe gesture, the navigation application rotates the virtual camera upwards and in a direction away from the 3D map scene 190. The navigation application rotates the virtual camera upwards so that the perspective view captured by the virtual camera can include more of the 3D map scene 190 that is ahead along the route.

In rotating the virtual camera upwards, the navigation application in this example maintains the location of the virtual camera fixed. In other words, the application in this example does not begin to move the virtual camera along the route before it finishes moving the virtual camera upward. Also, while rotating the camera, the application does not move the virtual camera along an arc 520, which is an arc along which the virtual camera moves in some embodiments to transition from a top-down 2D view of the map to one or more 3D perspective views of the map. Movement of the virtual camera along such an arc is described in U.S. Published Patent Applications 2013/0321401, 2013/0321400, and 2013/0322702, which are incorporated here by reference. In other embodiments, however, the navigation application begins to move the virtual camera along the route and/or along the arc 520 (e.g., upwards along this arc), while rotating the virtual camera upwards away from the 3D map scene at the beginning of the peek ahead movement.

The third stage 515 shows that after rotating the virtual camera upwards in the second stage 510, the navigation application moves the virtual camera along the virtual route in response to the peek-ahead swipe input.

Figure 6:
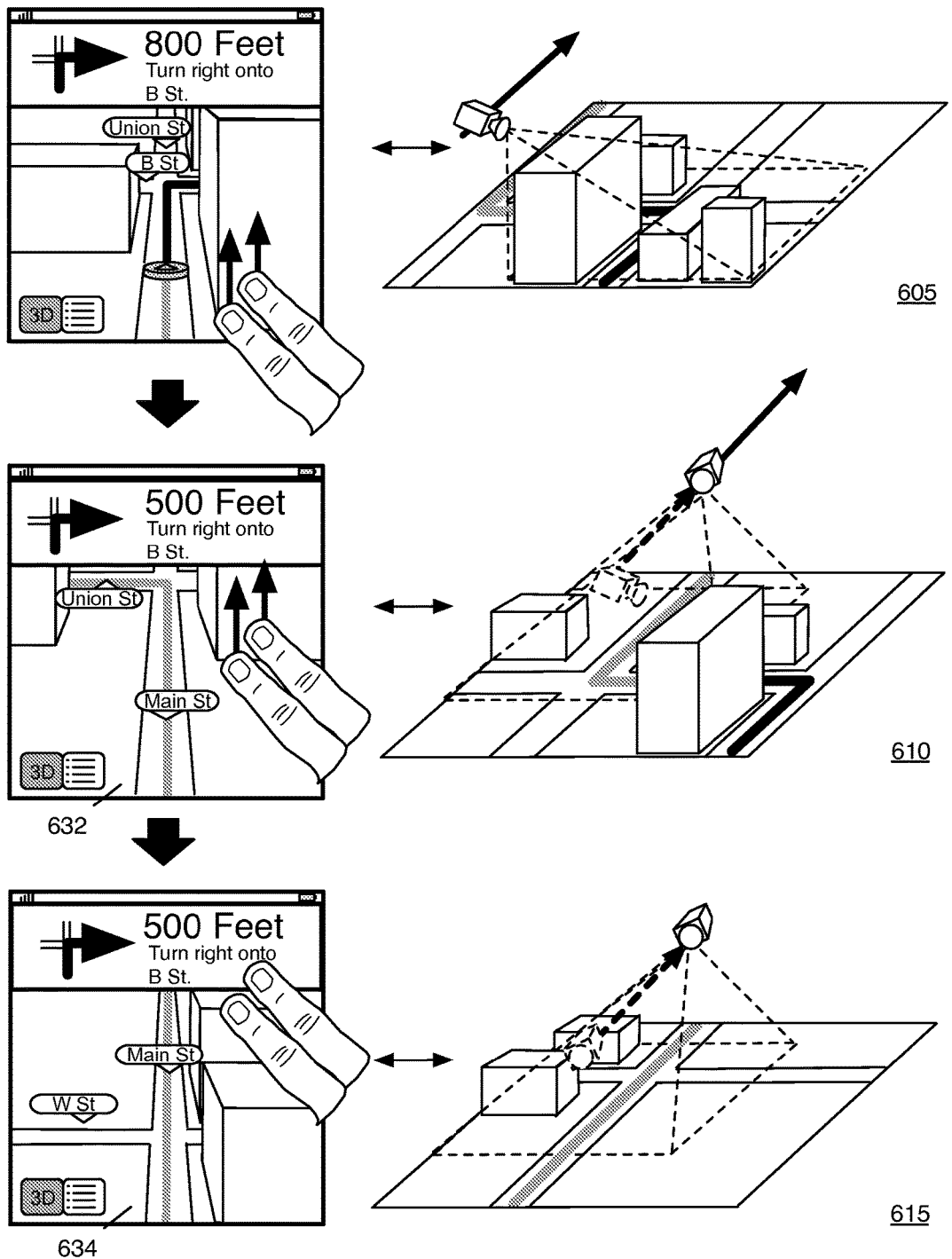
FIG. 6 illustrates an example of the navigation application performing a peek behind operation to present a portion of the navigated route that has already been traversed.

FIGS. 1-5 show examples in which the navigation application peeks ahead along a navigated route in response to user input. FIG. 6, on the other hand, illustrates an example of the navigation application performing a peek behind operation to present a portion of the navigated route that has already been traversed. This example is illustrates in three stages 605-615.

This example is similar to the example illustrated in FIG. 1, except that instead of receiving a swipe-down gesture, the device in FIG. 6 receives a swipe up gesture. The three stages 605-615 illustrate that in response to the swipe up gesture, the virtual camera travels back along the virtual route. In traveling back along the virtual route, the virtual camera (1) goes back over a left turn that the device made going from Main street onto Union street, and (2) continues backward on Main street along the path of the virtual route.

The second and third stages 610 and 615 show that as the camera travels back along the route, the navigation presentation 632 and 634 in these stages updates to reflect prior positions of the device along the route. Although the swipe-up gesture is shown in FIG. 6 to direct the application to perform the peek behind operation, other input (e.g., the swipe-down gesture) in other embodiments initiates the peek behind operation.

Figure 7:
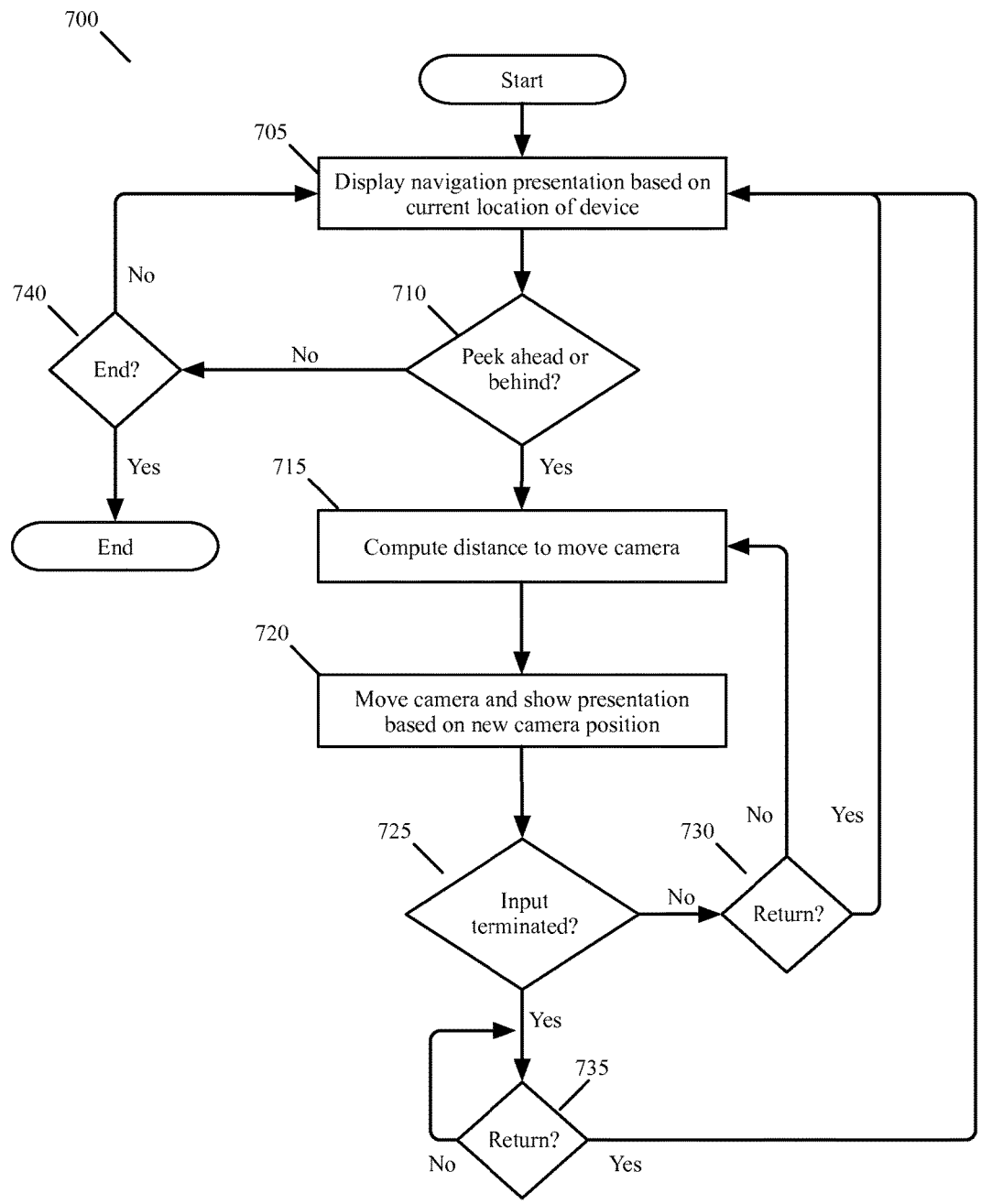
FIG. 7 illustrates a process that the navigation application of some embodiments performs to present a navigation presentation that can peek ahead or peek behind a navigated route.

FIG. 7 illustrates a process 700 that the navigation application of some embodiments performs to present a navigation presentation that can peek ahead or peek behind a navigated route. This process starts whenever a user directs the navigation application to start a navigation presentation that provides turn-by-turn navigation instructions as the user travels from a starting location to a destination location.

At 705, the process displays a navigation presentation based on the current location of the device. As the device traverses along the physical route, the navigation presentation shows a representation of the device on a map traversing along a virtual route that represents the physical route on the map. As the device reaches junctures along the physical route at which the device has to perform a maneuver, the navigation presentation provides visual and/or audible instructions regarding the maneuver that the device has to perform. To provide such instructions and presentation, the navigation application uses one or more location services (e.g., GPS service) of the device to track the current position of the device and correlate the tracked position to a position on the navigated route.

After 710, the process determines whether the navigation application has received input that directs the application to peek ahead or behind the device's current location in the navigation presentation. If not, the process determines (at 740) whether it should end. The process decides that it should end in some embodiments, when the device reaches its destination or when the user manually ends the navigation presentation. When the process determines (at 740) that it should end, it ends. Otherwise, it returns to 705, to present the navigation presentation for the current location of the device along the navigated route.

When the process determines (at 710) that the application has received input to peek ahead or behind, the process computes (at 715) a distance to move the camera based on the user's input. In some embodiments, the device has a touch-sensitive display screen through which it can receive touch input for moving the navigation presentation along the virtual route. In some of these embodiments, the process 700 computes (at 715) a first distance based on the received touch input. Based on the computed first distance, the process 700 computes (at 715) a second distance to move the navigation presentation along the route. In some embodiments, the second computed distance is directly proportional to the first computed distance.

In other embodiments, the second distance is not directly proportional to the first computed distance. For instance, as further described below, the process 700 iterates through 715 several times during the period that the user provides one touch input to peek ahead or behind the current location of the navigated presentation. In each iteration, the process 700 of some embodiments (1) computes a first distance that corresponds to an incremental portion of the touch input, and (2) from the computed first distance for that iteration, computes the second distance based on a formulation that reduces the computed second distance in subsequent iterations for the same computed first distance. This approach is meant to make it harder to peek ahead or behind at farther distances ahead or behind the current location on the navigated route.

After computing the distance to move the camera, the process (at 720) moves the camera along the navigated route by the computed distance, and renders the navigation presentations from the new position of the camera. In some cases, the virtual route includes several turns, and the movement of the virtual camera takes the virtual camera past one or more of these turns, so that the device's representation is no longer visible in the navigation presentation. Also, before moving the camera forward to peek ahead the navigated route, the process 700 in some embodiments rotates (at 720) the virtual camera slightly upward so that the perspective view generated by the virtual camera includes more of the 3D map scene that is ahead along the route. Other embodiments change the virtual camera's angle of rotation gradually while moving of the virtual camera in response to user input.

After 720, the process determines (at 725) whether the user input that initiated the peek ahead or behind operation has terminated. If not, the process determines (at 730) whether it should return the navigation presentation to the current location of the device. If not, the process returns to 715 to compute another incremental first distance input value, so that it can compute an incremental second distance value to move the camera and then move the camera based on the incremental second distance value. When the process determines (at 730) that it should return to navigation presentation to the current location of the device, it returns to 705 to display the navigation presentation based on the current location of the device.

The process makes the determination at 730 because in some embodiments the peek ahead or behind operation can be overridden by other factors. For instance, even while the user maintains his touch input for peeking ahead or behind, the process 700 in some embodiments returns the navigation presentation to the current location of the device when the device approaches a maneuver along a juncture. Other embodiments, however, do not override the peek ahead or behind request of the user while the user is maintaining his touch input. Accordingly, these embodiments transition from 725 to 715 when the process determines (at 715) that the user input has not terminated.

When the process determines (at 725) that the user input that initiated the peek ahead or behind operate has terminated, it transitions to 735, where it stays until it determines that the navigation presentation should return to the current location of the device. In different embodiments, the process 700 returns the navigation presentation to the current location of the device for different reasons. For instance, in some embodiments, the process 700 returns the navigation presentation to the current location when the device reaches a location along the physical route at which the device has to perform a navigation maneuver. Conjunctively, or alternatively, the process 700 in some embodiments returns the navigation presentation to the current location based on the expiration of a timer that the application set after the touch input terminated. Alternatively, the process 700 in some embodiments returns the navigation presentation to the current location once the touch input terminates.

When the process determines (at 735) that the navigation presentation to the current location of the device, the process returns to 705 to display the navigation presentation based on the current location of the device.

Figure 8:
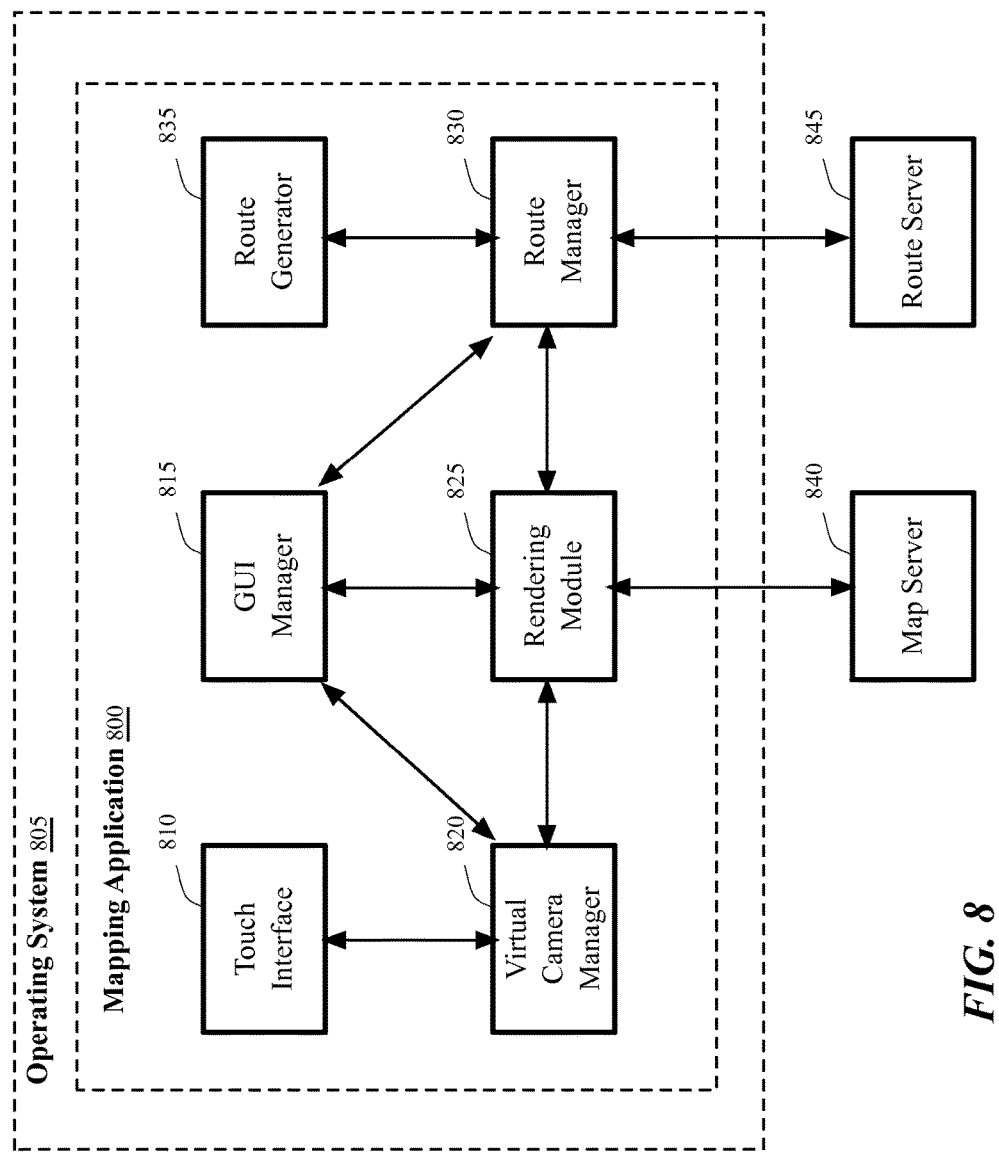
FIG. 8 illustrates example architecture of a navigation application that allows the user to peek ahead and behind a route.

FIG. 8 illustrates example architecture of a navigation application that allows the user to peek ahead and behind a route. In this example, a navigation application 800 of some embodiments executes on the operating system 805 of a mobile device. As shown, the navigation application 800 includes a touch interface 810, a GUI manager 815, a virtual camera manager 820, a rendering module 825, a route manager 830, and a route generator 835. This figure also illustrates a map server 840 and a route server 845.

The device 805 of some embodiments has a touch-sensitive screen (not shown) and/or a near-touch sensitive screen (not shown) that displays the output of the navigation application 800. The device 805 also facilitates the interaction between the navigation application and the map server 840 and the route server 845. In this figure, the device's own hardware and software architecture is not depicted for the simplicity of description and illustration. More details about a device on which the navigation application may execute will be described further below by reference to FIG. 9.

The map server 840 is a remote server that provides map data to the navigation application 800 that describes relative locations of streets, highways, points of interest, etc., in the map per the navigation application 800's request. The map data contains 2D and 3D map data at different zoom levels and perspectives.

The route server 845 is a remote server that provides route data to the navigation application 800 upon request. In some embodiments, the navigation application 800 sends information about a starting location and a destination location to the router server 845. The route server 845 of some embodiments computes a set of routes for different modes of transportation and returns the routes to the navigation application 800.

The route manager 830 of the navigation application receives information about starting and destination locations and sends the information to the router server 845 or to the route generator 835 to obtain routes that includes sets of navigation instructions. In some embodiments, the route manager 830 receives the information from the user through the GUI manager 815, which receives user selection/or specification through GUI items that the GUI manager 815 manages. The route manager 830 of some embodiments uses one or both of the route generator 835 and the route server 845 to obtain the routes. The router manager 830 of some embodiments also makes the default selection of a route and keeps track of the default mode of transportation.

The route generator 835 generates routes based on the information about the starting and ending locations from the route manager. The route generator 835 is a local equivalent of the route server 845. The route generator 835 is part of the navigation application 800 in some embodiments. In some embodiments, however, the route generator 835 is a stand-alone application that executes on the device 805.

The touch interface 810 receives the user's interaction with the screen (not shown) of the device 805. In some embodiments, the touch interface 810 receives touch information (e.g., coordinates of the part of the screen that sensed a touch). The touch interface 810 analyzes the information and determines whether the information can be interpreted meaningful gestures such vertical/horizontal swipes, whether there has been a multi-touch, etc. During a turn-by-turn navigation presentation, the touch interface 810 sends the analysis of the touch information to the virtual camera manager 820.

Based on the touch input, the virtual camera manager 820 translates the amount of touch input into a movement of the virtual camera. This movement of virtual camera includes instructions for rotating and/or moving the camera. The virtual camera manager 820 sends these instructions to the rendering module so that the rendering module can render a new location in the 2D or 3D scene that is being rendered to produce the turn-by-turn navigation presentation. In identifying the new location to render, the virtual camera or the rendering engine maintains the view to be rendered along the navigated route. In other words, the peek ahead or behind distance that is computed based on the gestural input is used in some embodiments to move the camera ahead or behind the navigated route to render positions ahead or behind the current location on the navigated route.

The GUI manager 815 manages a set of GUI items. When the virtual camera manager 820 determines that the virtual camera has to move past one or more junctures along the route, GUI manager receives input from the virtual camera manager that causes the GUI manager to change the maneuver banners that it displays over the map in the navigation presentation. This input is different in different embodiments. It might be the identities of the passed junctures in some embodiments, while it is simply a distance along the navigated route in other embodiments. Also, as mentioned above, the maneuver banners are not updated in some embodiments as the virtual camera peeks ahead or behind the navigated route. Accordingly, in these embodiments, the virtual camera does not direct the GUI manager to update the maneuver banners.

The GUI manager 815 also interacts with the route manager 830. As mentioned above, the GUI manager 815 provides the route manager with the user-specified information about routes to generate. The GUI manager 815 also requests and receives navigation instructions and generates rendering instructions for drawing banners in the display area. The GUI passes the rendering instructions to the rendering module 825 so that the rendering module 825 renders the banner in the display area. The GUI manager 815 generates rendering instructions for drawing other GUI items (e.g., an end control, a list control, route selection banners, etc.) in the display area. The GUI manager 815 also generates rendering instructions based on the user's interaction with the GUI items.

The rendering module 825 receives rendering instructions from the GUI manager 815, the virtual camera manager 820, and/or the route manager 830. The rendering module 825 also obtains map data from the map server 840. The rendering module 825 draws map views, routes, GUI items, etc. according to the instructions and map data.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
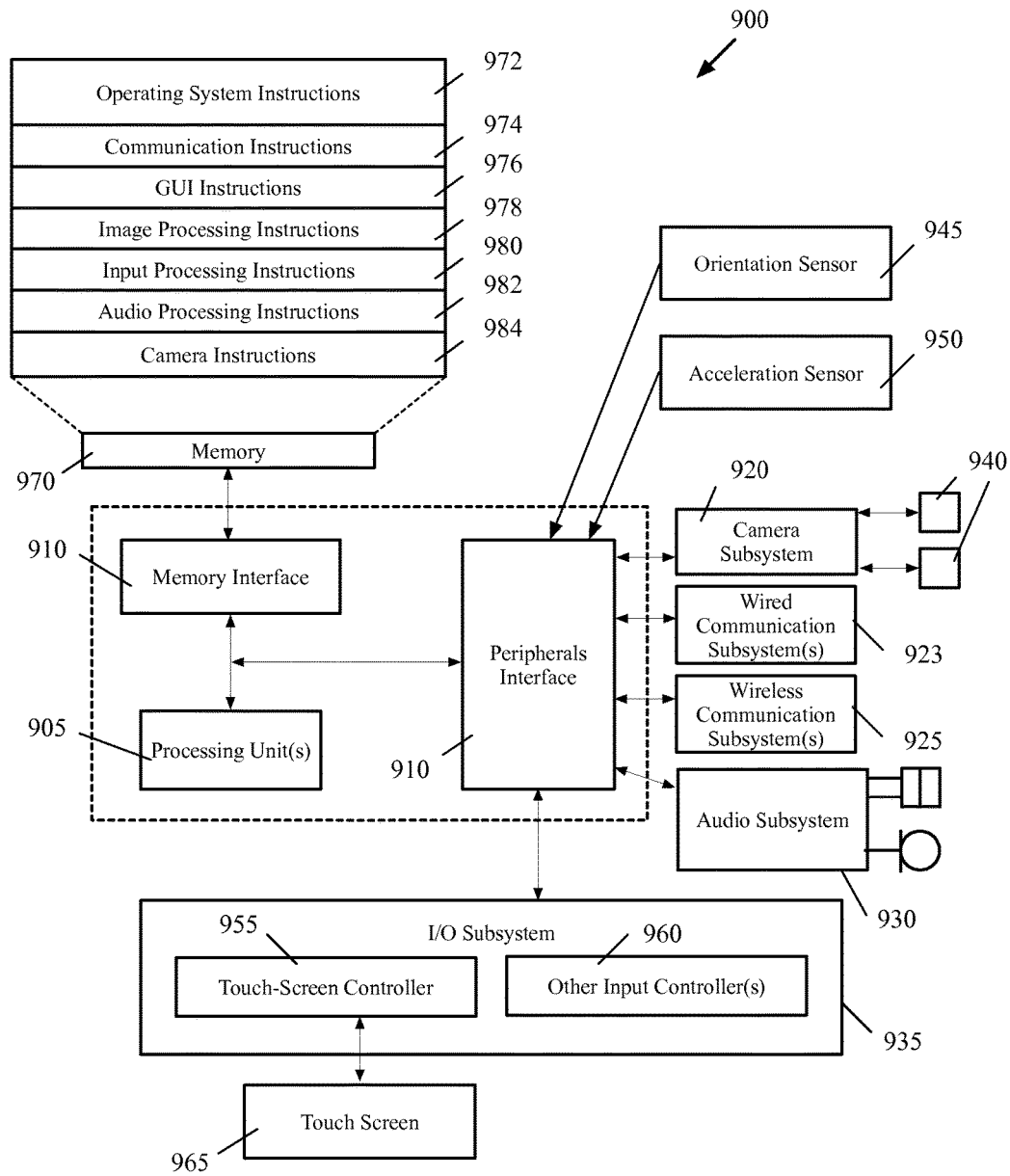
FIG. 9 is an example of an architecture of a mobile computing device of some embodiments.

The applications of some embodiments operate on mobile devices, such as smart phones (e.g., iPhones®) and tablets (e.g., iPads®). FIG. 9 is an example of an architecture 900 of such a mobile computing device. Examples of mobile computing devices include smartphones, tablets, laptops, etc. As shown, the mobile computing device 900 includes one or more processing units 905, a memory interface 910 and a peripherals interface 915.

The peripherals interface 915 is coupled to various sensors and subsystems, including a camera subsystem 920, a wireless communication subsystem(s) 925, an audio subsystem 930, an I/O subsystem 935, etc. The peripherals interface 915 enables communication between the processing units 905 and various peripherals. For example, an orientation sensor 945 (e.g., a gyroscope) and an acceleration sensor 950 (e.g., an accelerometer) is coupled to the peripherals interface 915 to facilitate orientation and acceleration functions.

The camera subsystem 920 is coupled to one or more optical sensors 940 (e.g., a charged coupled device (CCD) optical sensor, a complementary metal-oxide-semiconductor (CMOS) optical sensor, etc.). The camera subsystem 920 coupled with the optical sensors 940 facilitates camera functions, such as image and/or video data capturing. The wireless communication subsystem 925 serves to facilitate communication functions. In some embodiments, the wireless communication subsystem 925 includes radio frequency receivers and transmitters, and optical receivers and transmitters (not shown in FIG. 9). These receivers and transmitters of some embodiments are implemented to operate over one or more communication networks such as a GSM network, a Wi-Fi network, a Bluetooth network, etc. The audio subsystem 930 is coupled to a speaker to output audio (e.g., to output voice navigation instructions). Additionally, the audio subsystem 930 is coupled to a microphone to facilitate voice-enabled functions, such as voice recognition (e.g., for searching), digital recording, etc.

The I/O subsystem 935 involves the transfer between input/output peripheral devices, such as a display, a touch screen, etc., and the data bus of the processing units 905 through the peripherals interface 915. The I/O subsystem 935 includes a touch-screen controller 955 and other input controllers 960 to facilitate the transfer between input/output peripheral devices and the data bus of the processing units 905. As shown, the touch-screen controller 955 is coupled to a touch screen 965. The touch-screen controller 955 detects contact and movement on the touch screen 965 using any of multiple touch sensitivity technologies. The other input controllers 960 are coupled to other input/control devices, such as one or more buttons. Some embodiments include a near-touch sensitive screen and a corresponding controller that can detect near-touch interactions instead of or in addition to touch interactions.

The memory interface 910 is coupled to memory 970. In some embodiments, the memory 970 includes volatile memory (e.g., high-speed random access memory), non-volatile memory (e.g., flash memory), a combination of volatile and non-volatile memory, and/or any other type of memory. As illustrated in FIG. 9, the memory 970 stores an operating system (OS) 972. The OS 972 includes instructions for handling basic system services and for performing hardware dependent tasks.

The memory 970 also includes communication instructions 974 to facilitate communicating with one or more additional devices; graphical user interface instructions 976 to facilitate graphic user interface processing; image processing instructions 978 to facilitate image-related processing and functions; input processing instructions 980 to facilitate input-related (e.g., touch input) processes and functions; audio processing instructions 982 to facilitate audio-related processes and functions; and camera instructions 984 to facilitate camera-related processes and functions. The instructions described above are merely exemplary and the memory 970 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 9 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 9 may be split into two or more integrated circuits.

Figure 10:
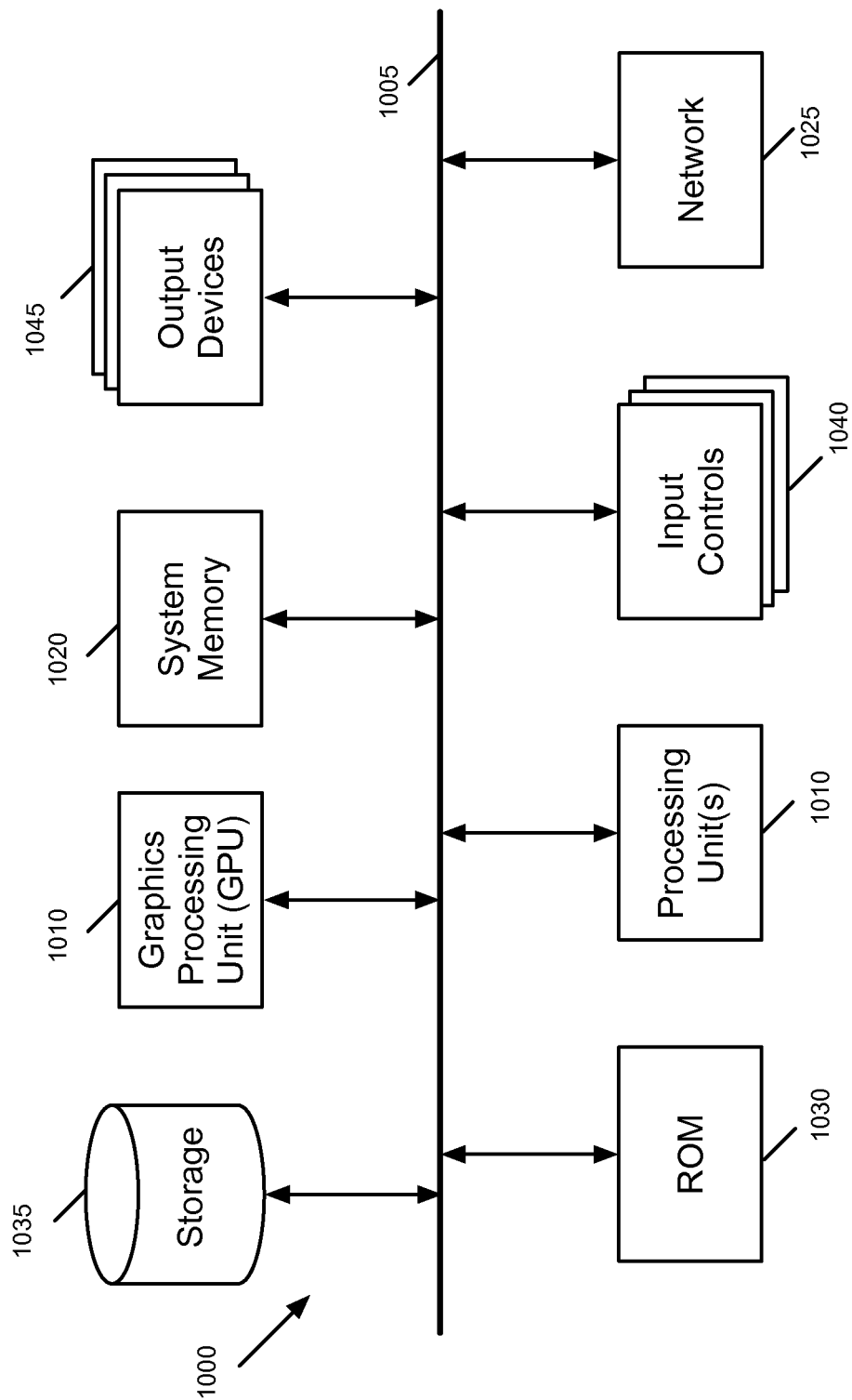
FIG. 10 conceptually illustrates an example of an electronic system with which some embodiments of the invention are implemented.

FIG. 10 conceptually illustrates another example of an electronic system 1000 with which some embodiments of the invention are implemented. The electronic system 1000 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1000 includes a bus 1005, processing unit(s) 1010, a graphics processing unit (GPU) 1015, a system memory 1020, a network 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the GPU 1015, the system memory 1020, and the permanent storage device 1035.

From these various memory units, the processing unit(s) 1010 retrieves instructions to execute and data to process in order to execute the processes of the invention. The processing unit(s) may be a single processor or a multi-core processor in different embodiments. Some instructions are passed to and executed by the GPU 1015. The GPU 1015 can offload various computations or complement the image processing provided by the processing unit(s) 1010. In some embodiments, such functionality can be provided using CoreImage's kernel shading language.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive, integrated flash memory) as the permanent storage device 1035.

Other embodiments use a removable storage device (such as a floppy disk, flash memory device, etc., and its corresponding drive) as the permanent storage device. Like the permanent storage device 1035, the system memory 1020 is a read-and-write memory device. However, unlike storage device 1035, the system memory 1020 is a volatile read-and-write memory, such a random access memory. The system memory 1020 stores some of the instructions and data that the processor needs at runtime. In some embodiments, the invention's processes are stored in the system memory 1020, the permanent storage device 1035, and/or the read-only memory 1030. For example, the various memory units include instructions for processing multimedia clips in accordance with some embodiments. From these various memory units, the processing unit(s) 1010 retrieves instructions to execute and data to process in order to execute the processes of some embodiments.

The bus 1005 also connects to the input and output devices 1040 and 1045. The input devices 1040 enable the user to communicate information and select commands to the electronic system. The input devices 1040 include alphanumeric keyboards and pointing devices (also called "cursor control devices"), cameras (e.g., webcams), microphones or similar devices for receiving voice commands, etc. The output devices 1045 display images generated by the electronic system or otherwise output data. The output devices 1045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 10, bus 1005 also couples electronic system 1000 to a network 1025 through a network adapter (not shown). In this manner, the computer can be a part of a network of computers (such as a local area network ("LAN"), a wide area network ("WAN"), or an Intranet), or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

Figure 11:
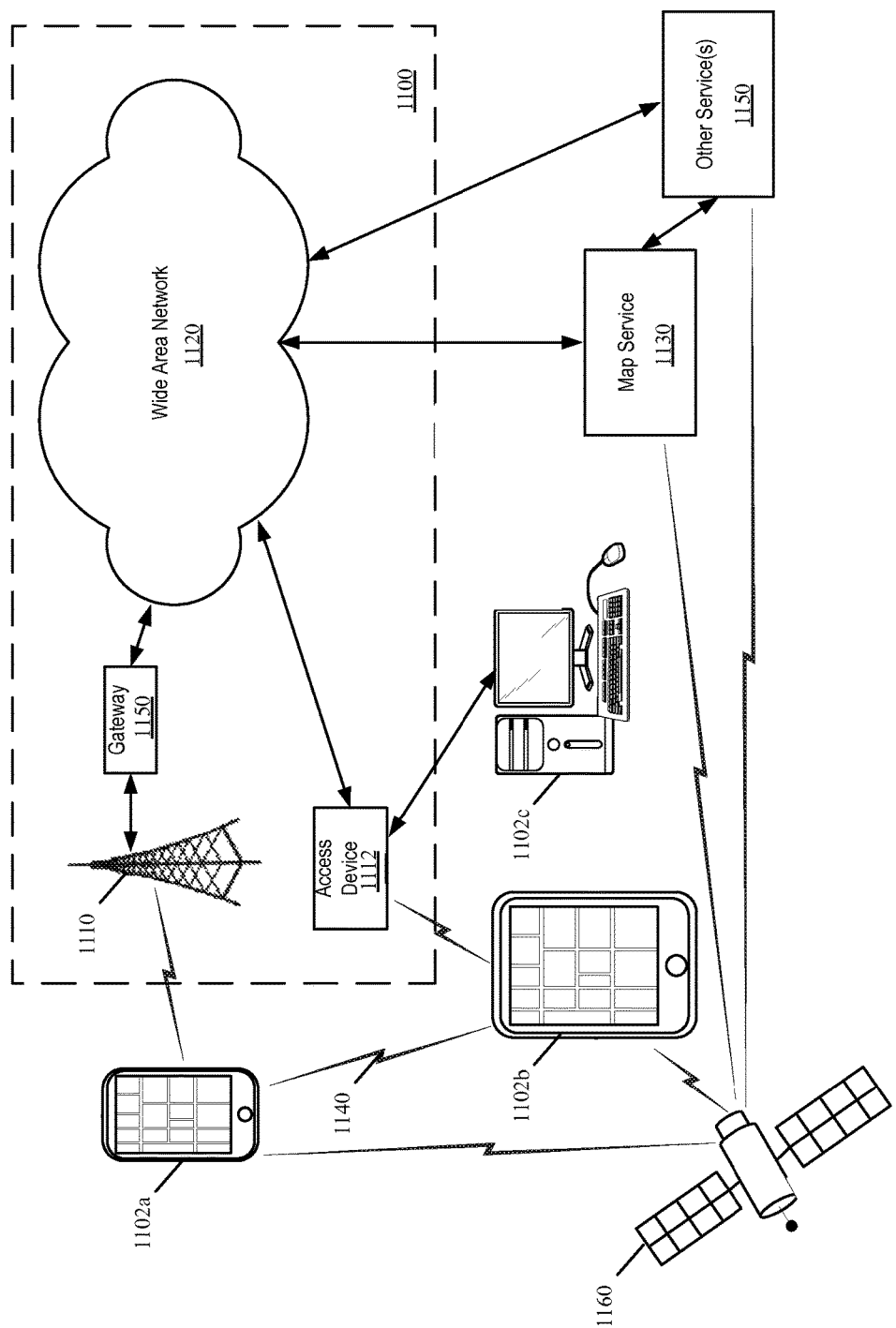
FIG. 11 illustrates a map service operating environment of some embodiments.

Various embodiments may operate within a map service operating environment. FIG. 11 illustrates one possible embodiment of an operating environment 1100 for a map service (also referred to as a mapping service) 1130 and client devices 1102a-1102c. In some embodiments, devices 1102a, 1102b, and 1102c communicate over one or more wired or wireless networks 1110. For example, wireless network 1110, such as a cellular network, can communicate with a wide area network (WAN) 1120, such as the Internet, by use of gateway 1114. A gateway 1114 in some embodiments provides a packet oriented mobile data service, such as General Packet Radio Service (GPRS), or other mobile data service allowing wireless networks to transmit data to other networks, such as wide area network 1120. Likewise, access device 1112 (e.g., IEEE 802.11g wireless access device) provides communication access to WAN 1120.

The client devices 1102a and 1102b can be any portable electronic or computing device capable of communicating with a map service (e.g., smart phone, tablet, laptop computer, etc.). Device 1102c can be any non-portable electronic or computing device capable of communicating with a map service (e.g., desktop computer, etc.). These devices may be multifunction devices capable of various functions (e.g., placing phone calls, sending electronic messages, producing documents, etc.). Though the devices 1102a-1102c are not shown as each accessing the map service 1130 via either the wireless network 1110 and gateway 1114 or the access device 1112, one of ordinary skill in the art will recognize that the client devices of some embodiments may access the map service via multiple different wired and/or wireless protocols.

Devices 1102a-1102c can also establish communications by other means. For example, these devices may communicate with other wireless devices (e.g., other devices 1102b, cell phones, etc.) over the wireless network 1110 or through access device 1112. Likewise the devices 1102a-1102c can establish peer-to-peer communications 1140 (e.g., a personal area network) by use of one or more communication subsystems, such as Bluetooth® communication or similar peer-to-peer protocols.

Devices 1102a-1102c may also receive Global Positioning Satellite (GPS) signals from GPS satellites 1160. In addition, in some embodiments the map service 1130 and other services 1150 may also receive GPS signals from GPS satellites 1160.

A map service 1130 may provide map services for one or more client devices 1102a-1102c in communication with the map service 1130 through various communication methods and protocols. A map service 1130 in some embodiments provides map information (e.g., map tiles used by the client devices to generate a two-dimensional or three-dimensional map presentation) and other map-related data, such as two-dimensional map image data (e.g., aerial view of roads utilizing satellite imagery), three-dimensional map image data (e.g., traversable map with three-dimensional features, such as buildings), route and direction calculations (e.g., driving route data, ferry route calculations, directions between two points for a pedestrian, etc.), real-time navigation data (e.g., turn-by-turn visual navigation data in two or three dimensions), traffic data, location data (e.g., where the client device currently is located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. The client devices 1102a-1102c may utilize these map services to obtain the various map service data, then implement various techniques to process the data and provide the processed data to various entities (e.g., internal software or hardware modules, display screens of the client devices, external display screens, or other external systems or devices.

The map service 1130 of some embodiments provides map services by generating and distributing the various types of map service data listed above, including map information used by the client device to generate and display a map presentation. In some embodiments, the map information includes one or more map tiles. The map tiles may include raster image data (e.g., bmp, gif, jpg/jpeg/, png, tiff, etc. data) for display as a map presentation. In some embodiments, the map tiles provide vector-based map data, with the map presentation data encoded using vector graphics (e.g., svg or drw data). The map tiles may also include various other information pertaining to the map, such as metadata. Some embodiments also encode style data (e.g., used to generate textures) into the map tiles. The client device processes (e.g., renders) the vector and/or raster image data to generate a map presentation for display as a two-dimensional or three-dimensional map presentation. To transmit the map tiles to a client device 1102a-1102c, the map service 1130 of some embodiments, performs various optimization techniques to analyze a map tile before encoding the tile.

In some embodiments, the map tiles are generated by the map service 1130 for different possible display resolutions at the client devices 1102a-1102c. In some embodiments, the higher zoom levels may include more detail (e.g., more street level information, etc.). On the other hand, map tiles for lower zoom levels may omit certain data (e.g., the street level details would not be used when displaying the entire earth).

To generate the map information (e.g., map tiles), the map service 1130 may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

In some embodiments, the map service 1130 responds to requests from the client devices 1102a-1102c for map information. The client devices may request specific portions of a map, or specific map tiles (e.g., specific tiles at specific zoom levels). In some embodiments, the client devices may provide the map service with starting locations (or current locations) and destination locations for a route calculations, and request turn-by-turn navigation data. A client device may also request map service rendering information, such as map textures or style sheets. Requests for other geographic data may include, but are not limited to, current location, wireless network coverage, weather, traffic information, or nearby points-of-interest.

The client devices 1102a-1102c that obtain map service data from the map service 1130 and render the data to display the map information in two-dimensional and/or three-dimensional views. Some embodiments display a rendered map and allow a user, system, or device to provide input to manipulate a virtual camera for the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. Other input devices to the client device may be used including, e.g., auditory input (e.g., spoken words), a physical keyboard, mouse, and/or a joystick. Some embodiments provide various visual feedback to virtual camera manipulations, such as displaying an animation of possible virtual camera manipulations when transitioning from two-dimensional map views to three-dimensional map views.

In some embodiments, a client device 1102a-1102c implements a navigation system (e.g., turn-by-turn navigation), which may be part of an integrated mapping and navigation application. A navigation system provides directions or route information, which may be displayed to a user. As mentioned above, a client device may receive both map image data and route data from the map service 1130. In some embodiments, the navigation feature of the client device provides real-time route and direction information based upon location information and route information received from a map service and/or other location system, such as a Global Positioning Satellite (GPS) system. A client device may display map image data that reflects the current location of the client device and update the map image data in real-time. The navigation features may provide auditory or visual directions to follow a certain route, and some embodiments display map data from the perspective of a virtual camera biased toward the route destination during turn-by-turn navigation.

The client devices 1102a-1102c of some embodiments implement various techniques to utilize the received map service data (e.g., optimized rendering techniques). In some embodiments, a client device locally stores some of the information used to render map data. For instance, client devices may store style sheets with rendering directions for image data containing style identifiers, common image textures (in order to decrease the amount of map image data transferred from the map service), etc. The client devices of some embodiments may implement various techniques to render two-dimensional and three-dimensional map image data, including, e.g., generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data.

In various embodiments, map service 1130 and/or other service(s) 1150 are configured to process search requests from any of the client devices. Search requests may include but are not limited to queries for businesses, addresses, residential locations, points of interest, or some combination thereof. Map service 1130 and/or other service(s) 1150 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 1130 and/or other service(s) 1150 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 1130 and/or other service(s) 1150, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 1130 and/or other service(s) 1150 provide one or more feedback mechanisms to receive feedback from client devices 1102a-1102c. For instance, client devices may provide feedback on search results to map service 1130 and/or other service(s) 1150 (e.g., feedback specifying ratings, reviews, temporary or permanent business closures, errors etc.); this feedback may be used to update information about points of interest in order to provide more accurate or more up-to-date search results in the future. In some embodiments, map service 1130 and/or other service(s) 1150 may provide testing information to the client device (e.g., an A/B test) to determine which search results are best. For instance, at random intervals, the client device may receive and present two search results to a user and allow the user to indicate the best result. The client device may report the test results to map service 1130 and/or other service(s) 1150 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory machine readable medium storing a program for providing turn-by-turn navigation directions as a device traverses a physical route, the device having a touch-sensitive display screen, the program comprising sets of instructions for:
    presenting a navigation presentation from a perspective of a virtual camera that traverses along a virtual route on a map as the device traverses along the physical route, the presentation displaying a first portion of the virtual route;
    receiving an input to look at a second portion of the virtual route;
    changing the perspective of the virtual camera; and
    moving the virtual camera along the virtual route to generate and display renderings of the map at the second portion of the virtual route using the changed perspective of the virtual camera.

2. The non-transitory machine readable medium of claim 1, wherein the program further comprises a set of instructions for returning the virtual camera to a current location along the virtual route that is defined by the current location of the device along the physical route.

3. The non-transitory machine readable medium of claim 1, wherein the changing of the perspective of the virtual camera occurs before moving the virtual camera along the virtual route to generate and display renderings of the map at the second portion of the virtual route.

4. The non-transitory machine readable medium of claim 1, wherein the changing of the perspective of the virtual camera occurs in conjunction with the moving of the virtual camera along the virtual route to generate and display renderings of the map at the second portion of the virtual route.

5. The non-transitory machine readable medium of claim 1, wherein the program further comprises sets of instructions for:
    defining the map in terms of a two dimensional scene;
    wherein the virtual camera captures successive top-down views of the two-dimensional map scene.

6. The non-transitory machine readable medium of claim 1, wherein the program further comprises sets of instructions for displaying:
    a next maneuver banner for a current location of the device along the physical route; and
    displaying a maneuver banner for a location ahead or behind the current location of the device along the physical route at the second portion of the virtual route.

7. The non-transitory machine readable medium of claim 1, wherein the program further comprises a set of instructions for defining the map in terms of a three dimensional scene and the virtual camera captures successive perspective views of the three-dimensional map scene.

8. The non-transitory machine readable medium of claim 1, wherein the virtual route comprises a plurality of turns, and wherein moving the virtual camera along the virtual route comprises moving the virtual camera past a subset of the turns.

9. The non-transitory machine readable medium of claim 1, wherein the program further comprises a set of instructions for:
    tracking a position of the device as the device travels along the physical route; and
    correlating the tracked position of the device to a location on the virtual route to move a displayed representation of the device along the virtual route.

10. The non-transitory machine readable medium of claim 1, wherein the program further comprises a set of instructions for:
    tracking the device as the device travels along the physical route to a destination;
    determining when the device travels off the physical route;
    identifying another route to the destination when the device travels off the physical route; and
    displaying the newly identified route and instructions to guide the device along the newly identified route.

11. The non-transitory machine readable medium of claim 1, wherein the device is a mobile device.

12. The non-transitory machine readable medium of claim 1, wherein the device is a navigation device of a vehicle.

13. A method of providing turn-by-turn navigation directions as a device traverses a physical route, the device having a touch-sensitive screen, the method comprising:
    providing a navigation presentation from a perspective of a virtual camera that traverses along a virtual route on a map based on a current location of the device as the device traverses along the physical route;
    displaying a first portion of the virtual route;
    receiving an input to look at a second portion of the virtual route; and
    based on the received input:

changing an angle of rotation of the virtual camera so that the perspective view of the virtual camera changes; and upon completing the change of the angle of rotation, moving the virtual camera along the virtual route to generate and display renderings of the map at the second portion of the virtual route.

14. The method of claim 13, further comprising returning the virtual camera to a current location along the virtual route that is defined by the current location of the device along the physical route.

15. The method of claim 14, wherein the virtual camera is returned to the current location after a predetermined period of time and the pre-determined period of time is measured by a timer, the method further comprising:

setting the timer for the pre-determined period of time, wherein returning the virtual camera to the current location is based on the expiration of the timer.

16. The method of claim 15, wherein the received input is a swipe gesture and the act of setting the timer is performed when the swipe gesture terminates.

17. The method of claim 13, wherein the virtual route comprises a plurality of turns, wherein moving the virtual camera along the virtual route comprises moving the virtual camera past a subset of the turns.

18. The method of claim 13 further comprising:

tracking a position of the device as the device travels along the physical route; and correlating the tracked position of the device to a location on the virtual route to move the displayed representation of the device along the virtual route.

19. The method of claim 13 further comprising:

tracking the device as the device travels along the physical route to a destination;

determining when the device travels off the physical route; identifying another route to the destination when the device travels off the physical route; and displaying the newly identified route and instructions to guide the device along the newly identified route.

* * * * *